United States Patent [19]

Weeks et al.

[11] 3,939,745

[45] Feb. 24, 1976

[54] APPARATUS FOR SLITTING COIL STOCK

[75] Inventors: James E. Weeks; Charles J. Runkle; Bernhard T. Junker; Gary E. O'Connor, all of Raleigh, N.C.

[73] Assignee: Monsanto Company, St. Louis, Mo.

[22] Filed: Oct. 30, 1974

[21] Appl. No.: 519,173

[52] U.S. Cl. .................. 83/425.3; 83/444; 83/500; 83/665; 83/675
[51] Int. Cl.² ........................................ B23D 19/06
[58] Field of Search .......................... 83/118–122, 83/500–503, 664, 665, 675, 425.3

[56] References Cited
UNITED STATES PATENTS

| 1,939,246 | 12/1933 | Antonsen | 83/664 X |
|---|---|---|---|
| 3,359,842 | 12/1967 | Young | 83/500 |
| 3,520,221 | 7/1970 | Thomas | 83/664 |
| 3,575,329 | 4/1971 | Hannabery | 83/500 X |
| 3,771,398 | 11/1973 | Schaefer et al. | 83/500 X |

Primary Examiner—Frank T. Yost
Attorney, Agent, or Firm—Donald J. Fitzpatrick

[57] ABSTRACT

An apparatus is disclosed for precision slitting of metallic coil stock into multiple continuous lengths of wire, wherein the resultant wire is characterized by a small cross-sectional area. The apparatus comprises means for guiding coil stock into a pair of revolving monolithic cutter rolls and means for collecting the slit wire. The rolls are positioned in engaging relationship and each roll contains a plurality of lands and grooves so that stock can be slit with an aspect ratio of less than five.

16 Claims, 6 Drawing Figures

APPARATUS FOR SLITTING COIL STOCK

BACKGROUND OF THE INVENTION

1. Field of the Invention

This invention relates generally to apparatus for slitting coil stock and more particularly to an apparatus for the precision slitting of light gage stock, such as black plate, into multiple continuous lengths of high quality wire.

2. Description of the Prior Art

One of the more common mill conversion processes a metallic coil undergoes is slitting. Generally speaking, a wide coil is slit into a number of narrow multiples on a slitting line. Such a line includes an uncoiler for positioning and feeding the coil into a slitter and a re-coiler for rewinding the slit strands into tightly wound narrow coils. Two factors, economics and specific technical requirements, are of paramount importance in the design and operation of all slitting lines.

The slitting operation itself is accomplished by two sets of circular cutters mounted on parallel arbors and with the respective cutters set in a staggered sequence. The cutters are also aligned and overlapped in such a manner so as to cause a shearing action to take place when metal is forced between them during slitting. There are many factors affecting the economics of a successful and profitable slitting operation. Some of these factors include material, hardness of material, maximum and minimum thickness of material, coil diameter and weight and coil handling facilities. The techical requirements involved in designing a line to perform economically must therefore consider all these factors. For example considering the present state of the slitting art, it is not commercially feasible nor economically practical to slit coil stock into multiples with a cross-sectional area of approximately $7.0 \times 10^{-4}$ square inches. It is also recognized that slitting stock with an aspect ratio of less than about 5 cannot be practiced on a commercial basis.

The conventional slitting operation of the prior art, employs a pair of parallel top and bottom arbors with a specifically arranged set-up of knives, spacers and shims. These components are carefully designed and machined to close tolerances from alloy steels. The specific slitting operation, viz. material and slit width, control the component design. What is known in the art as "setting up slitting arbors" consists of first placing a knife on the top arbor and then placing a spacer equal in thickness to this knife on the bottom arbor. A knife is then placed adjacent to the spacer on the bottom arbor and a spacer equal to the width of the strip to be cut is then placed on the top arbor, the next step is to place a spacer equal to the width of the strip to be cut on the bottom arbor. Shims are carefully placed along the length of the arbor depending upon such factors as clearance and material to be slit. This procedure of placing spacers, knives and shims is continued alternately on the top and bottom arbors until the last pair of knives and spacers have been added. After the arbors are set up, the bottom arbor is placed into a housing and the top arbor is then lowered and placed into the housing so that the knives overlap and satisfactory knife clearance is established. It is quite apparent that such a set up is both laborious and expensive.

The width of the slit material is controlled by the width of the spacers employed. Steel coil stock is currently slit into widths exceeding about one-half inch and with aspect ratios greater than 5 on a commercial basis. The aspect ratio is defined as:

$$\frac{\text{width of slit multiple}}{\text{thickness of stock}}$$

For example, to slit a cold rolled 20 gauge, 0.0368 inch, 24 inches wide coil into 6, 4 inch multiples the aspect ratio would be approximately 110 and would decrease to 55 for 2 inch multiples and so forth to approximately 14 for ½ inch multiples. To slit black plate coil stock, wherein black plate hereinafter is defined as, a product of the cold-reduction method in gages No. 29 and lighter (thickness 0.0141 inch and under), into widths narrower than one-half inch (0.500 inch) would require smaller aspect ratios because of the smaller width of the slit multiple.

For example, to slit a 0.0141 inch thick, 24 inch wide black plate coil into 340, 0.0705 inch wide multiples would require an aspect ratio of 2. To accomplish such a slitting operation several hundred knives and spacers would have to be placed alternately on arbors as hereinbefore described. A set-up technique would require the ability to measure the thicknesses of the spacers and knives to extreme levels of accuracy, and elaborate precautions in matching and stacking them on the arbors so that tolerance accumulation would occur in a like manner on both arbors. Furthermore, due to the very small cross section of the knives and spacers, warpage, breakage and curling resulting from machining all become problems. Using knives with such a small cross sectional area also poses problems in cutting because the actual force which can be applied during slitting is greatly restricted.

Aside from the actual slitting operation the slit product frequently must also meet very stringent quality requirements. Assuming that slitting arbors can be so assemblied from knives, spacers and shims, for certain critical applications the resultant product must have minimum burr formation and good mechanical properties particularly high fatigue resistance. Furthermore, uniformity must be present between adjacent and neighboring multiples. To achieve acceptable mechanical properties the slit product must be burr free and have a generally rectangular or square cross-sectional configuration. A slitter consisting of knives, shims and spacers could not produce a slit product with the aforementioned characteristics and an aspect ratio of less than 5 because arbors with stacked mates can not be matched thereby resulting in excessive variations in tolerances.

The present invention enables light gage coil stock of less than approximately 29 gage such as conventional black plate to be rapidly and economically slit into multiples with an aspect ratio of less than 5.

SUMMARY OF THE INVENTION

In accordance with the teachings of the present invention, an apparatus for slitting light gauge coil stock into multiples with an aspect ratio of less than 5 is provided.

The apparatus comprises a guide mechanism for properly guiding a coil into the nip of a pair of rotating cutters. The cutters are solid monolithic structures mounted in engaging relationship on parallel arbors. The cutters contain a plurality of lands and grooves. The grooves are characterized by essentially vertical sides and a curved root and the ratio between the groove width and the thickness of the coil to be slit is generally less than 5 to 1 and furthermore, the spacing between the lands of the first roll and the groove roots of the second roll are set at a predetermined distance. Adjacent an outer groove on each cutter is a shoulder for adding lateral strength to the cutters.

It is an object of this invention to slit black plate coil stock into wire.

It is an object of this invention to provide an apparatus for slitting coil stock into multiple continuous lengths of wire.

A further object of this invention is to slit coil stock into wire exhibiting good mechanical and surface properties.

It is an object of this invention to provide an apparatus for slitting coil stock into narrow widths with an aspect ratio of less than 5.

A further object of this invention is to slit black plate coil stock into wire with a cross-sectional area of less than $7.0 \times 10^{-4}$ sq. in.

A still further object of this invention is to provide cutters adaptable for slitting coil stock into a number of fine wires.

DETAILED DESCRIPTION OF THE PREFERRED EMBODIMENT

Figure 1:
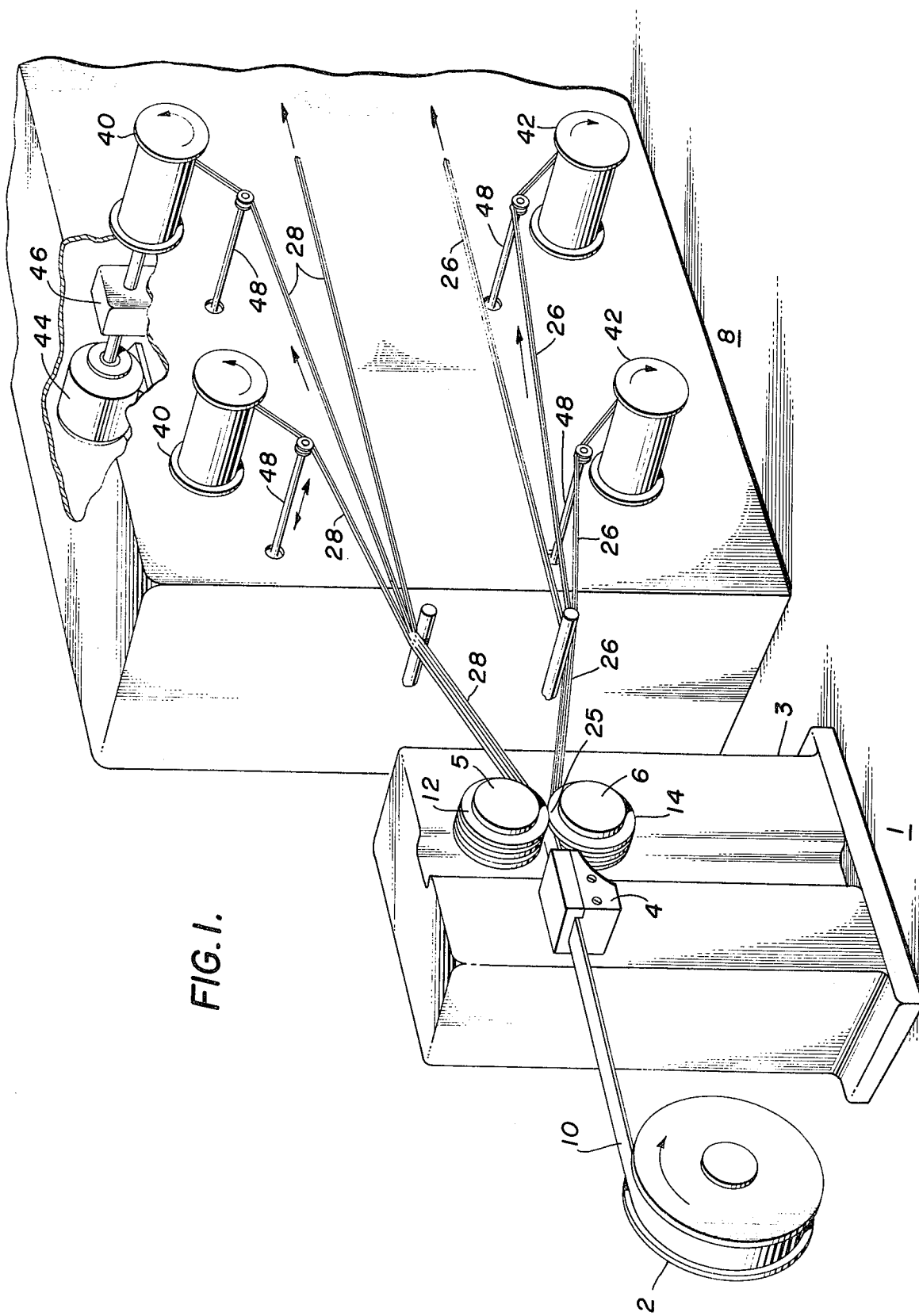
FIG. 1 is a side elevation in schematic showing the apparatus of this invention.

Coil stock 10 is delivered to a slitting line 1 from a payoff stand 2. The stock is a cold rolled steel coil generally of a black plate gage, that is, in thicknesses less than about No. 29 gage. As the coil is uncoiled it enters mill stand 3.

Mill stand 3 is a rigid structure and contains conventional equipment such as a drive train, a lubrication system, and appropriate supports. Positioned at the delivery end of said mill stand is strip guide means 4. A pair of parallel arbors, top arbor 5 and bottom arbor 6 are positioned in said stand. The arbors are driven by suitable means (not shown) and are further adapted to revolve in opposite directions. Positioned adjacent the exit end of said mill stand is take up means 8 (not shown in detail) for collecting the slit multiples formed after slitting the strip.

Figure 2:
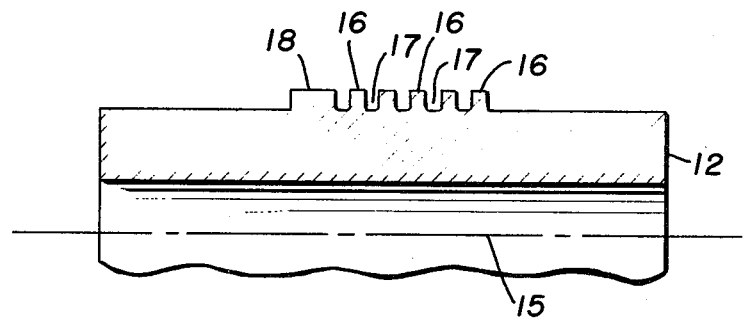
FIG. 2 is a front elevational view showing the construction of a monolithic cutter roll.
Figure 3:
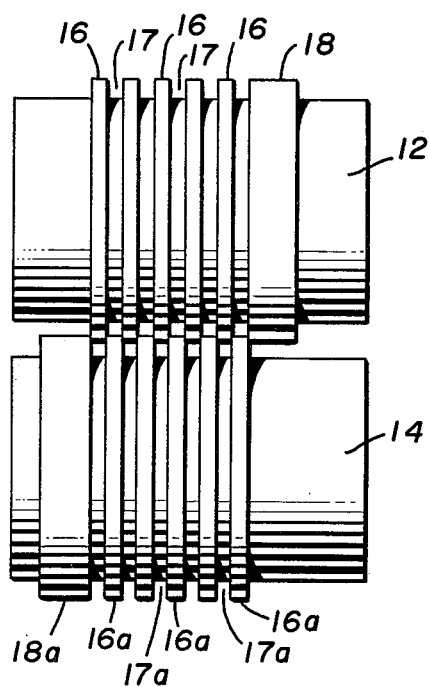
FIG. 3 is a front elevational view showing a pair of cutters in engaging relationship.
Figure 4:
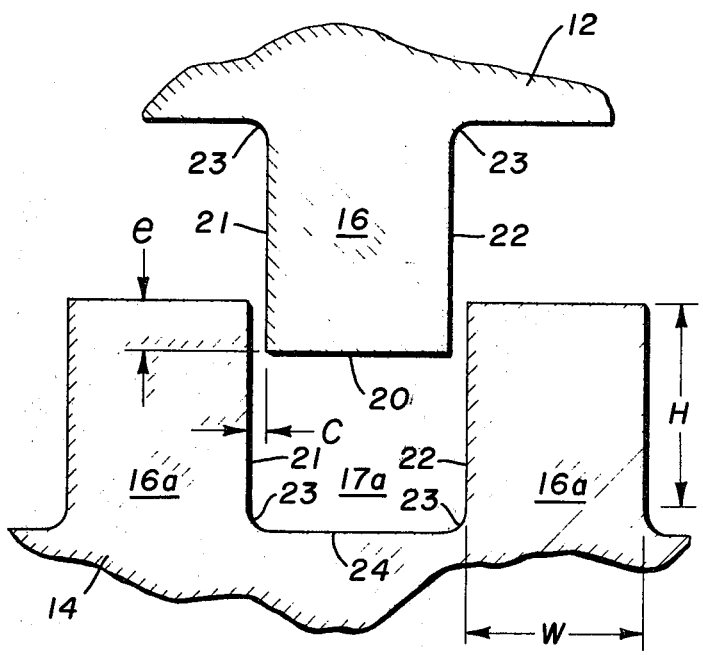
FIG. 4 is a front elevational view showing in enlarged detail a section of a pair of cutters in engaging relationship.

The top and bottom arbors previously mentioned contain top cutter 12 and bottom cutter 14. Referring now to FIGS. 2, 3 and 4 the construction, engagement and operation of cutters 12 and 14 will be more clearly understood.

In these figures the cutters are shown as matching solid monolithic elements machined from alloy tool steel such as AISI Type M-2 tool steel. The cutters 12 and 14 are cylindrical and each contain a central axially extending bore 15. This bore is of such a diameter as to facilitate placement of the cutters onto the arbors. The cutters are thereafter fastened to the arbors in any conventional manner well known in the art, such as by set screws or by providing the arbors with a threaded segment and employing locking nuts to maintain the cutters in position.

Carefully positioned on the cutters in a predetermined pattern are the following annular elements, a plurality of lands 16, a plurality of parallel sided grooves 17 and a shoulder 18. It is these elements, lands 16, grooves 17 and shoulder 18 of cutter 12 that act in cooperation with the corresponding lands 16a, grooves 17a and shoulder 18a of cutter 14 that actually slit stock 10 as it is passed between the arbors 5 and 6.

As shown in FIG. 4 lands 16 and 16a comprise a flat portion 20 and two essentially vertical walls 21 and 22. Both walls terminate at arc 23.

Grooves 17 and 17a are defined by the vertical walls 21 and 22 and the width of said grooves is represented by the numeral 24. This width is sufficient to permit lands 16 and 16a to pass into the grooves with a certain amount of side clearance $c$. The required side clearance for slitting depends upon a number of factors such as the carbon content of the steel being slit, coil stock microstructure, coil stock thickness, the quality of the fracture surface and the shape of the slit product. Therefore, groove width 24 is equal to the land flat portion 20 plus two times $c$ which is equal to the width of the slit product.

As further shown in FIG. 4 vertical walls 21 and 22 are shown to have a theoretical height "H", wherein H represents cutter height. This dimension is equal to the thickness of the slit strip plus the amount of cutter engagement as shown by $e$. H is controlled so as not to exceed a maximum amount in order to avoid breakage of the elements and to reduce deflection of the lands 16, 16a under loads. Flat portion 20 is also illustrated by the letter "W" wherein W represents the width of the lands 16, 16a.

Knife geometry can be expressed by the ratio of H/W. Cutter strength, rigidity and wear can be directly related to the value of this ratio.

As hereinbefore mentioned cutter engagement is shown by the letter $e$. When the cutters are arranged in engaging relationship this means that cutter 14 is mounted on bottom arbor 6, top arbor 5 containing cutter 12 is then carefully lowered so that the lands 16 of cutter 12 interpose grooves 17a a distance $e$ of cutter 14. Further, the engagement of cutter 12 within the grooves of cutter 14 is such that a clearance $c$ exists between each and every vertical component of the cutters. Engagement $e$ and clearance $c$ control the fracture mode of the strip. It has been determined that for optimum properties in the slit product fracture should occur by means of the shear mode. Therefore, the cutter engagement is such that slitting produces fracture by the shear mode when a strip is wedged into the gap formed between the cutters. This gap or nip 25 is shown in FIG. 1 wherein the strip 10 starts to become wedged between upper cutter 12 and lower cutter 14 and slitting of the strip commences at this point. The strip proceeds through slitting line 1 by virtue of friction forces set up by the cooperating action of the cutters. As the cutters rotate points of friction between the strip and the lands of one cutter and the grooves of the other cutter act to move the strip through the slitter.

In some instances engagement $e$ can be zero, i.e., the lands and grooves of the cutters are not in the position illustrated in FIG. 4. When the cutters are adjusted so there is zero engagement the flat portions 20 of lands 16 are parallel and coplanar with the flat portions of lands 16a. The cutters would be set up in this manner when hard and brittle material is being slit such as strip with a martensitic microstructure. Fracture will still occur in the desired shear mode but less cutter engagement is required in order to propagate a crack that will initiate separation. Clearance $c$ would be an amount appropriate for the factors as hereinbefore described.

Figure 5:
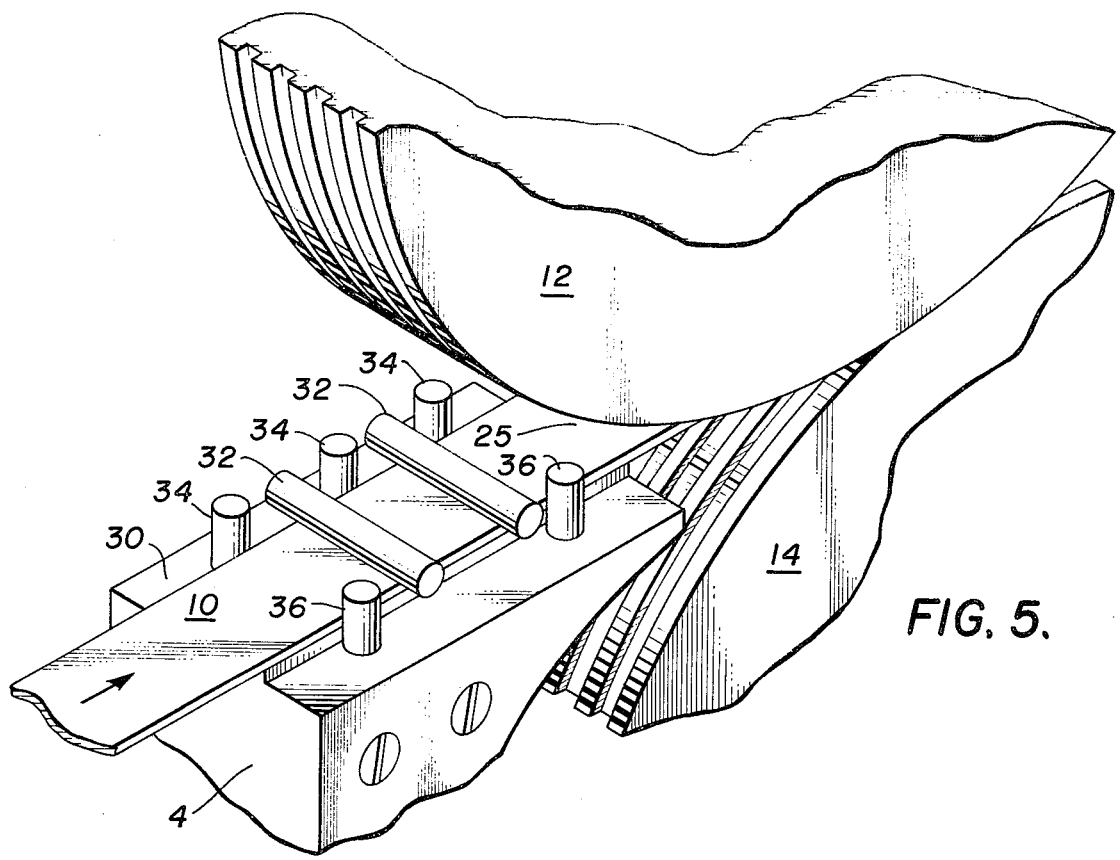
FIG. 5 is a front elevational view showing the strip guide means.

FIG. 5 shows the construction of guide means 4. The guide means is positioned at the entry end of mill stand 3 and acts to maintain a uniform and stable path for the stock as it feeds into the cutter. For a high yield and stable slitting operation such a guide is essential.

The strip guide shown in FIG. 5 comprises a flat hardened steel base 30, horizontal rolls 32, fixed vertical pins 34 and rotating rolls 36. The vertical pins and rolls are positioned on either side of strip 10. The horizontal rolls 32 are driven (drive means not shown) and maintain the strip essentially flat on base 30 as it enters nip 25. Vertical pins 34 are fixed in position and provide a reference surface for the strip edge. To minimize wear these elements can be tungsten carbide or some other wear resistant material. Vertical rolls 36 are adapted to rotate about their respective axes. These rolls absorb any variation in strip width and may be spring loaded so as to exert a force on the strip edge. The vertical rolls prevent the strip from twisting or rotating as it enters nip 25.

As shown in FIGS. 2 and 3 each cutter contains a shoulder 18 and 18a. The dimensions of these shoulders are identical to the dimensions of lands 16 and 16a with the exception of the width of the shoulder. Typically the shoulder is about 3 times as wide as the lands. This wider dimension gives lateral support to this element when the cutters are engaged and prevents breakage. If this shoulder were not present the lateral forces exerted during slitting would cause the outside lands to break off and ultimately all the lands would fail.

Figure 6:
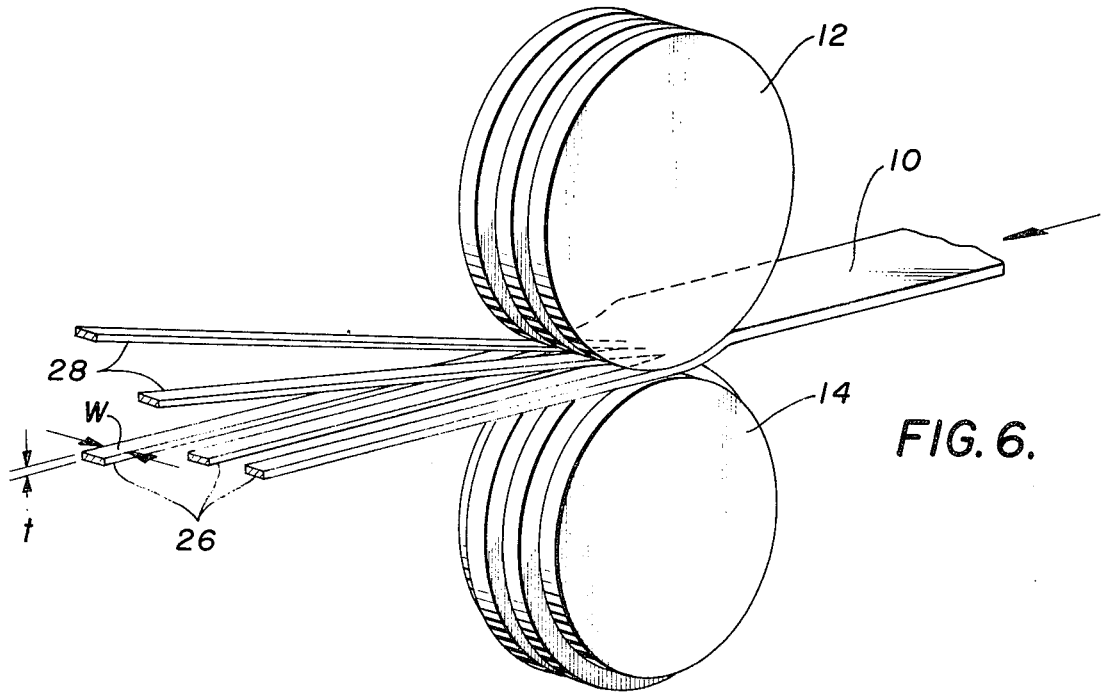
FIG. 6 is an isometric view showing strip stock being slit by the apparatus of this invention.

FIG. 6 shows in simplified form the cutters of this invention slitting incoming coil stock 10 into a number of fine wires. To facilitate rewinding and collecting the slit wire on take up means 8 alternate wires 26 starting from the outside wire are rewound on the bottom of take up means 8 whereas the adjacent wires 28 are rewound on the top of said take up means (not shown). A burr is formed as the coil fractures. By winding the slit multiples in this manner, i.e. on two sets of recoilers the burrs will all be in the same direction because during slitting the burrs alternate between each multiple. This insures evenly and tightly wound slit multiples.

Take-up means 8 shown in FIG. 1 comprises a plurality of top take-up spools 40 and bottom take-up spools 42, controlled drive means 44 such as a DC motor drives the spools and also controls the speed of the spools during take-up and tension means 46 for example a friction clutch regulates wire tension during take-up. In some applications a torque motor can be used to drive the spools and maintain tension during take-up, friction clutches could then be eliminated. FIG. 1 also shows a traversing mechanism 48 for uniformly distributing the wire on the take-up spools.

During the slitting operation the slit wire is forced into the cutter grooves. The wire must be pulled out of these grooves in order that slitting may proceed and a uniformly wound spool can be obtained. The take-up means employed in the apparatus of this invention must therefore function in such a manner so that it provides adequate tension to pull the wire out of the grooves but not enough so as to break the wire. This tension can be applied in various ways such as by pinch rolls or by the take-up device depicted in FIG. 1. After the wires are pulled out of the cutter rolls they must be rewound into a commercially acceptable package. It has been found that the pull out tension must remain constant. Maintaining constant tension during take-up calls for controlling the winder drive so as to slow the spool down as the diameter of the material on the spool builds up. At the same time, torque output of the drive must increase. This is true because as the package builds up, more torque is required to maintain a constant tension.

FIG. 6 also defines aspect ratio as being the ratio of the width of the slit strip (W) divided by the thickness of the strip ($t$). The apparatus of this invention is designed to slit coil stock into wire with an aspect ratio of less than 5 and the cross-sectional area of the resultant product being less than $7.0 \times 10^{-4}$ sq. in. The apparatus herein described is particularly well adapted to produce wire with an aspect ratio of less than 2 and a cross-sectional area less than about $2 \times 10^{-4}$ sq. inches.

In one installation of the apparatus of this invention a black plate coil 0.010 inches thick and 0.228 inches wide was slit into 24 multiples. The cross-sectional area of the slit multiples was $1 \times 10^{-4}$ sq. inches. The aspect ratio of the slit product was 1:1.

It may, therefore, be seen that the invention described herein provides an apparatus for economically slitting black plate coil stock into wire.

Various modifications of the invention in addition to those shown and described herein will become apparent to those skilled in the art from the foregoing description and accompanying drawings. Such modifications are intended to fall within the scope of the appended claims.

We claim:

1. An apparatus for slitting metallic coil stock into multiple continuous lengths of small cross-sectional wire, comprising:
    a rigid stationary housing;
    a first arbor positioned in the upper portion of said housing;
    a second arbor positioned in the lower portion of said housing and substantially parallel to said first arbor;
    a first and a second monolithic cutter roll positioned in engaging relationship on said arbors, each roll comprising, a plurality of lands and grooves wherein the grooves are characterized by essentially vertical sides and a curved root, the ratio between groove width and said coil thickness being less than 5:1 and the spacing between the lands of said first roll and the groove roots of said second roll being a pre-determined distance so that during slitting fracture occurs in the shear mode.

2. The apparatus as recited in claim 1 further comprising, guide means positioned at the delivery end of said housing for guiding said stock into said apparatus.

3. The apparatus as recited in claim 1 further comprising, means for taking up said wire.

4. The apparatus as recited in claim 3 wherein said take up means further comprises:
    a take up spool;

means for supplying tension to said wire whereby said wire is pulled out of said cutter rolls; and means for winding said wire on said take up spool.

5. The apparatus as recited in claim 1 further comprises, a first arbor and a second arbor positioned in a horizontal plane.

6. The apparatus as recited in claim 1 wherein each said monolithic roll further comprises a shoulder adjacent an outer groove.

7. The apparatus as recited in claim 6 wherein said shoulder is at least three times as wide as said lands.

8. The apparatus as recited in claim 1 wherein the ratio between groove width and said coil thickness is less than 3:1.

9. The apparatus as recited in claim 2 wherein said guide means maintains the stock flat and without rotational movement during slitting.

10. An apparatus for slitting black plate coil stock into multiple continuous lengths of wire of a cross-sectional area of less than about $7.0 \times 10^{-4}$ square inches, comprising:
 a rigid stationary housing;
 guide means positioned in front of said housing for guiding said black plate into said apparatus without rotational movement during slitting;
 a first arbor positioned in the upper portion of said housing;
 a second arbor positioned in the lower portion of said housing and substantially parallel to said first arbor;
 a first and a second monolithic cutter roll positioned in engaging relationship on said arbors, each roll comprising, a plurality of lands and grooves wherein the grooves are characterized by essentially vertical sides and a curved root, the ratio between groove width and said black plate thickness being less than 3:1 and the spacing between the lands of said first roll and the groove roots of said second roll being a pre-determined distance and a shoulder adjacent an outer groove said shoulder being at least three times as wide as said lands.

11. The apparatus as recited in claim 10 wherein the distance between said first cutter lands and said second cutter groove roots is such that said black plate fractures in the shear mode during slitting.

12. The apparatus as recited in claim 10 wherein said arbors are positioned in a horizontal plane.

13. An apparatus for slitting metallic coil stock into multiple continuous lengths of small cross-sectional wire comprising:
 a first and a second monolithic cutter roll positioned in parallel relationship, each roll comprising, a plurality of lands and grooves wherein the grooves have essentially vertical sides terminating at a curved root, a nip being formed by the spacing between the lands of said first roll and the groove roots of said second roll; and means for supporting said first and second rolls.

14. Cutters adapted for slitting metallic coil stock, comprising: first and second cylindrical elements wherein each said element further comprises, a plurality of annular grooves spaced along said cylinder in a predetermined pattern and each said groove having a pair of vertical walls terminating at a curved root; and, a
 plurality of annular lands wherein each said land is adjacent a groove so that the width of each said land is defined by the spacing between a pair of adjacent annular grooves.

15. Cutters as defined in claim 14 wherein each said element contains an annular shoulder adjacent an outer most groove.

16. Cutters as defined in claim 15 wherein said shoulder is at least three times as wide as said lands.

* * * * *